United States Patent [19]

Wienand

[11] Patent Number: 5,037,488
[45] Date of Patent: Aug. 6, 1991

[54] TEMPERATURE SENSOR CONSTRUCTION
[75] Inventor: Karl H. Wienand, Aschaffenburg, Fed. Rep. of Germany
[73] Assignee: Heraeus Sensor GmbH, Fed. Rep. of Germany
[21] Appl. No.: 545,369
[22] Filed: Jun. 28, 1990
[30] Foreign Application Priority Data Jul. 15, 1989 [DE] Fed. Rep. of Germany ....... 3923535

[51] Int. Cl.$^5$ ............................................ H01L 35/02
[52] U.S. Cl. ................................. 136/230; 374/208; 136/225
[58] Field of Search ............... 136/225, 230, 211, 212; 374/208, 210; 174/254

[56] References Cited

U.S. PATENT DOCUMENTS

| 2,886,475 | 5/1959 | McKay | 117/212 |
| 2,916,537 | 12/1959 | Reid et al. | 136/4 |
| 3,758,346 | 9/1973 | Falkenberg et al. | 136/202 |
| 3,979,226 | 9/1976 | Renner et al. | 136/208 |
| 4,036,665 | 7/1977 | Barr et al. | 136/202 |
| 4,376,927 | 3/1983 | McGalliard | 337/297 |
| 4,516,106 | 5/1985 | Nolting | 338/28 |

FOREIGN PATENT DOCUMENTS

| 1930952 | 1/1970 | Fed. Rep. of Germany . |
| 3134166 | 3/1983 | Fed. Rep. of Germany . |
| 81231 | 4/1981 | German Democratic Rep. . |

Primary Examiner—Brooks H. Hunt
Assistant Examiner—Chrisman D. Carroll
Attorney, Agent, or Firm—Frishauf, Holtz, Goodman & Woodward

[57] ABSTRACT

A temperature sensor construction suitable for use in mechanically oscillating systems features a protective tube 8 containing a temperature sensor 11, a springy carrier board 1 with conductive tracks 2,3 and terminals 4,5,6,7 for a signal transmission conductor. The carrier 1 is mounted, under spring tension, facing the inner surface of the protective tube 8. The conductive tracks preferably run parallel to the axis of the protective tube and have contacts 4,5 at one end for connection to the temperature sensor 11 and contacts 6,6',7,7' at the other end for connection to the signal transmission leads 12, 12', 13, 13'.

10 Claims, 1 Drawing Sheet

TEMPERATURE SENSOR CONSTRUCTION

FIELD OF THE INVENTION

The present invention relates generally to a temperature sensor and, more particularly, to a temperature sensor which is mounted in a protective tube and connected to a signal transmission cable by conductive leads and terminals provided within that protective tube.

BACKGROUND OF THE INVENTION

German Patent 19 30 952 discloses a temperature-sensitive element adapted for use as a motor protection sensor. A thermistor is mounted in a window of a flexible insulating board. Both sides of the thermistor are covered by thin insulating sheets which support printed leads for making contact with the thermistor. The temperature sensitive element, together with the insulating sheets, are located in a leaf-like envelope or shrouding, the ends of the conductive leads being connected to terminal ends of a signal transmission line by means of solder contacts.

This prior art device is, due to its flattened structure, practically usable only in coils of an electrical machine, and cannot be installed in protective tubes.

Further, East German Patent DD-PS 81,231 discloses a resistance thermometer for temperature measurement under conditions of extreme fluctuation, such as in the exhaust gases of ship diesel machinery. A thermometer has a protective tube, including an insulating tube made from a suitable ceramic material for receiving one or multiple measuring resistors including inner conductors. These conductors are in turn surrounded by insulating tubes of a suitable ceramic material. The inner conductors must either be made in one piece running from the measuring resistance coils to the contacts in the terminal head, or one must provide a connecting point in the inner conductor which lies outside the critical oscillation or fluctuation zone. The insulating tube combination is closed off at its transition to the terminal head by a heat-tolerating, hardened, but not embrittled, paste.

Experience has shown that making the connection between the thermal sensor and the conducting leads at separate connection points represents a substantial problem in terms of vulnerability to oscillation.

U.S. Pat. No. 2,916,537, REID & GROSS/GENERAL DYNAMICS discloses a temperature sensor which, for reasons of higher sensitivity and lower weight, is made in the form of conductive tracks on a board-like plastic carrier, such as epoxy resin (col. 3, line 53). The ends of the tracks which form the thermocouple element are each provided with a respective connection contact for lead wires. The temperature measurement is done in a flowing medium which is fed through openings in the board forming the substrate. Such an arrangement is suitable for measurement of a medium which flows over a large flat surface, but its use in a protective tube is impractical because of the large surface area required.

Accordingly, it is an object of the present invention to provide a temperature sensor construction in which the temperature sensor is located in a protective tube and in which conductors running through the tube have connection contacts to signal transmission conductors, yet in which the measuring element is practically oscillation-free. In particular, the use of economical elements should reduce resonance phenomena resulting from audio-frequency machine vibrations and which until now tended to cause destruction of conductors and/or erroneous measurement results. The field of use particularly includes audio-frequency engine vibrations from compressors, from diesel drive mechanisms and exhaust gas temperature measurement in internal combustion engines. Depending upon the application, one should be able to use, as the temperature sensor, either temperature measuring resistors or piezo-electric temperature sensors.

THE INVENTION

Briefly, the temperature sensor construction of the present invention features conductors which are arranged, electrically isolated from one another, in the form of conductive tracks on a springy carrier, mounted under spring tension on the inner surface of the protective tube. A carrier which is already in a bowed orientation is less likely to resonate under the influence of vibrations.

It has been found that an advantageous and economical structure is to make the carrier in the form of a flexible printed circuit, which substantially avoids resonance oscillations in the frequency range between 0 and 5 KiloHertz.

In the preferred embodiment, the temperature sensor construction includes conductors which are printed on a flexible flat plastic carrier which tolerates temperatures in the range from about $-269°$ C. to about $300°$ C.

Preferably, the carrier and conductive tracks are manufactured using standard printed circuit (PC) board technology and thus require no special manufacturing steps.

Further, in a preferred embodiment, one applies, on top of a conductive track of copper or aluminum or of a copper- or aluminum-based alloy, another layer made of nickel, of a platinum-group metal or a nickel- or platinum-group-metal-based alloy. The advantage of this is that the economical yet electrically good conducting layer is protected from high temperature corrosion by the nickel or precious metal layer.

DRAWINGS

FIG. 1 is a perspective view illustrating the flexible carrier and its conductive tracks before insertion into the protective tube; and FIG. 2 is a perspective view, partially in cross section, of the temperature sensor structure with the carrier board installed.

DETAILED DESCRIPTION

Figure 1:
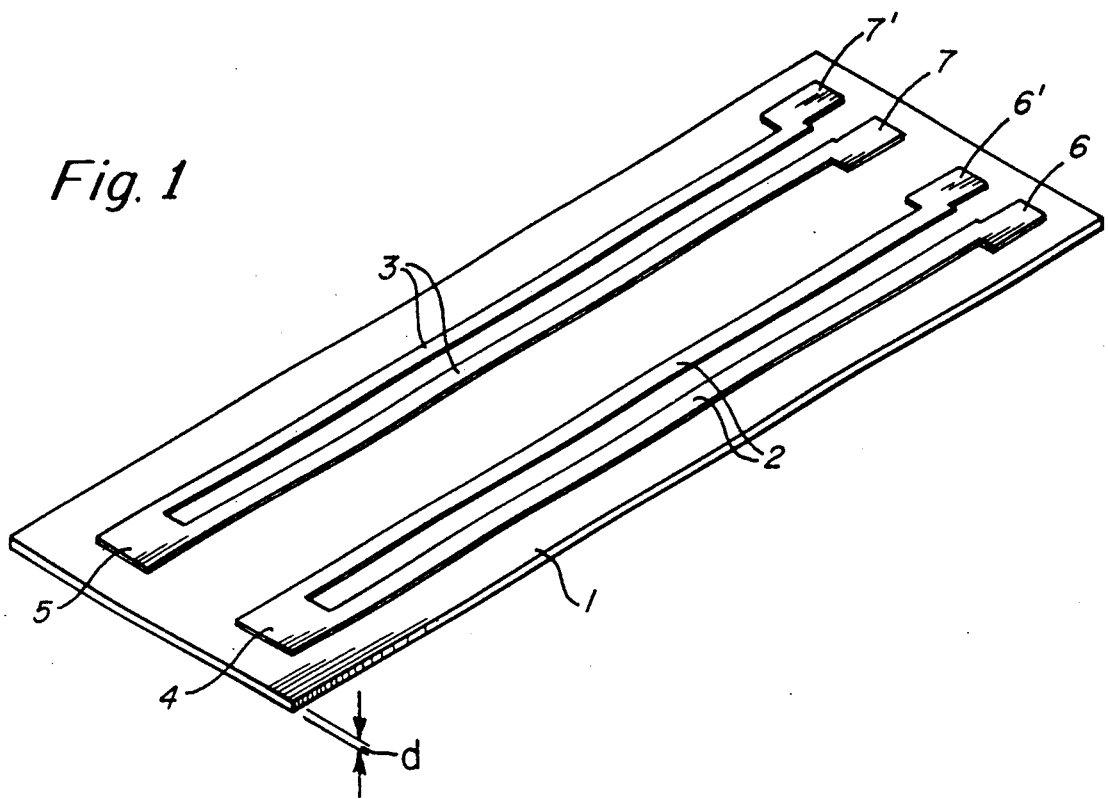

As shown in FIG. 1, the carrier is preferably a flexible circuit board 1 made of a temperature-tolerant plastic. On the upper surface of the PC board 1 are located strip-like, parallel-running conductive tracks 2, 3 formed, at one end, with connection contacts 4, 5 for the temperature sensor and, at the opposite end, with connecting contacts 6, 6', 7, 7' for the signal transmission leads. The carrier is a springy plastic sheet having a thickness d in the range from about 25 microns to about 250 microns. Depending upon the temperature conditions of the intended application, suitable material for the carrier plate includes plastics such as polytetrafluoroethylene (PTFE), polyimid, epoxy resin or other plastics, such as PEEK (UK trademark of ICI plc for Polyaryletherketone). Experience has shown that it is particularly advantageous to use polytetrafluorolethylene (PTFE, popularly known by the trademark TEFLON) since it is a moderately priced product and is a plastic which can be used in a temperature range between −269° C. and 300° C. At very high temperatures, it is possible to substitute plastics, such as PBI, which tolerate brief warming to an upper temperature limit of 550° C. or 750° C. without loss of their material characteristics.

The conducting tracks preferable comprise copper or aluminum or a copper-or aluminum-based alloy. In a preferred embodiment, one applies, on top of this base layer of the conductive tracks, a further layer of nickel. The thickness of the conductive track is preferably in the range between 1 micron and 70 microns. For clarity of illustration, the carrier shown in FIG. 1 is not drawn to the scale just described.

The tracks are applied to the circuit board by vapor deposition or by cathode sputtering and subsequently reinforced by chemical or galvanic treatment to their ultimate thickness.

Figure 2:
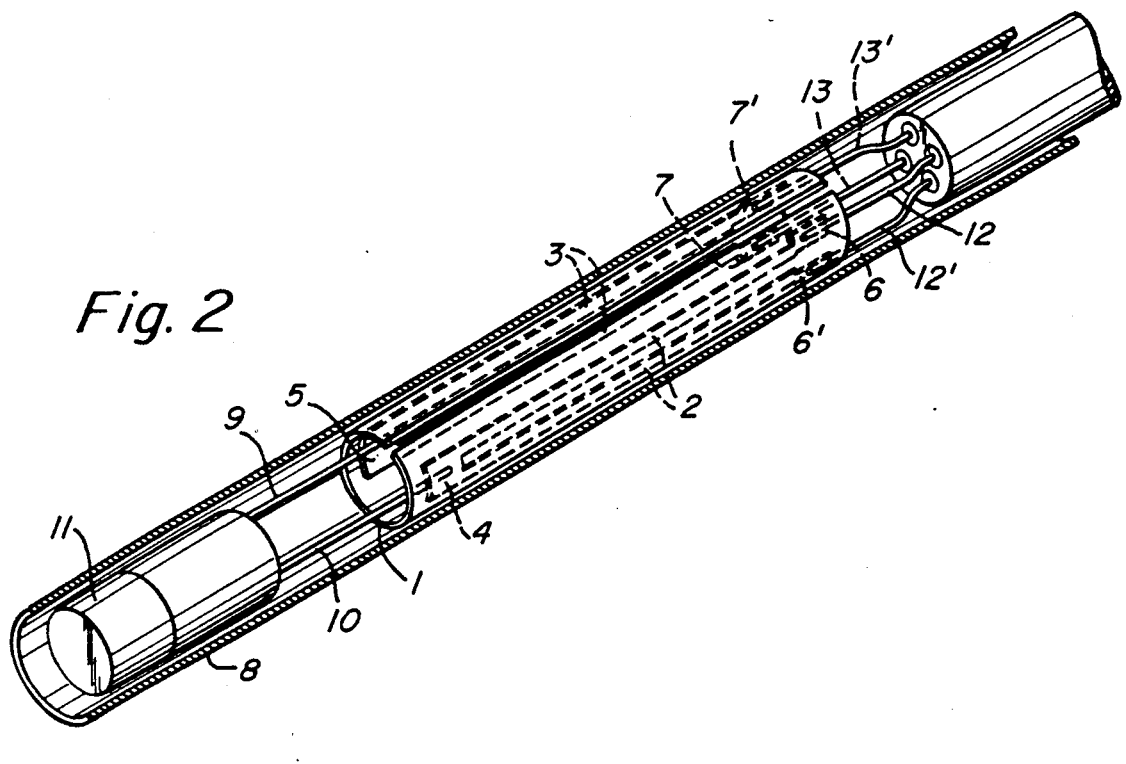

FIG. 2 illustrates carrier 1 in a protective tube 8 of metal. The carrier board is mounted in the tubes so that the surface of the carrier with the conductive tracks 2, 3 is facing the inner surface of the protective tube. Contact points and 5 are connected by leads 9, 10 with the thermo-sensor 11, formed as a temperature-measuring resistor. It is of course also possible to install a piezoelectric temperature sensor as the thermo-sensor. As previously noted, protective tube 8 preferably comprises metal.

Carrier 1 is provided at its other end with contact surfaces 6, 6', 7, 7', each pair of board contacts connecting with the corresponding contact of the thermo-sensor. In this manner, reliability is increased by providing a double signal transmission path. The contact points are connected to the respective connecting leads 12, 12', 13, 13' by ultrasonic welding. It is of course, also possible to connect the contact points by hard or soft soldering to the connecting leads.

As the material for the carrier, in addition to the already mentioned plastics, PETP (PolyEthyleneTerePhthalate), PEEK (Polyaryletherketone) and PBI (Polybenzimidazole) are suitable; for higher temperature applications in the range up to 550° C., PBI is particularly suitable.

When using a resistance measurement element as the thermal sensor, platinum is a suitable resistance material. A suitable material for the protective tube is stainless steel.

I claim:

1. Temperature sensor construction resistant to audio frequency resonance vibrations, comprising
   a protective tube (8);
   a thin, elongated carrier of elastic material (1) mounted in a bowed orientation inside said protective tube (8), in order to resist said resonance vibrations;
   a plurality of pairs of conductive tracks (2, 3) formed on said carrier (1) and extending generally parallel to a central axis of said tube, thereby defining first and second ends of each track;
   a respective contact (4, 5) formed at first ends of each respective pair of said tracks (2, 3) for connection of a respective lead of a temperature sensor (11); and
   contacts (6, 6', 7, 7') formed at second ends of said tracks (2, 3) for connection of leads (12, 12', 13, 13') of a signal transmission cable,
   said bowed orientation of said elastic carrier (1) tending to reduce vulnerability, of said connections between leads and contacts, to disconnection resulting from carrier oscillations.

2. Temperature sensor construction according to claim 1,
   wherein said elastic carrier (1) is a board having at least one insulating surface, and
   said conductive tracks (2, 3) comprise at least one layer applied to said insulating surface.

3. Temperature sensor construction according to claim 2,
   wherein said conductive tracks (2, 3) comprise at least two superimposed metal layers.

4. Temperature sensor construction according to claim 1,
   wherein said carrier (1) is stable at temperatures up to at least 180° C.

5. Temperature sensor construction according to claim 4,
   wherein said carrier (1) consists essentially of a material selected from the group consisting of
   epoxy resin, polytetrafluoroethylene, and polyimide.

6. Temperature sensor construction according to claim 1,
   wherein said conductive tracks (2, 3) comprise a layer consisting essentially of a material selected from the group consisting of
   copper, aluminum, a copper alloy, and an aluminum alloy.

7. Temperature sensor construction according to claim 2,
   wherein said conductive tracks (2, 3) comprise a layer consisting essentially of a material selected from the group consisting of
   copper, aluminum, a copper alloy, and an aluminum alloy.

8. Temperature sensor construction according to claim 3,
   wherein said conductive tracks (2, 3) comprise a layer consisting essentially of a material selected from the group consisting of
   copper, aluminum, a copper alloy, and an aluminum alloy.

9. Temperature sensor construction according to claim 4,
   wherein said conductive tracks (2, 3) comprise a layer consisting essentially of a material selected from the group consisting of
   copper, aluminum, a copper alloy, and an aluminum alloy.

10. Temperature sensor construction according to claim 5,
    wherein said conductive tracks (2, 3) comprise a layer consisting essentially of a material selected from the group consisting of
    copper, aluminum, a copper alloy, and an aluminum alloy.

* * * * *